United States Patent [19]

Stava

[11] Patent Number: 4,947,021
[45] Date of Patent: Aug. 7, 1990

[54] METHOD AND APPARATUS FOR TIG WELDING

[75] Inventor: Elliott K. Stava, Brecksville, Ohio

[73] Assignee: The Lincoln Electric Company, Cleveland, Ohio

[21] Appl. No.: 358,655

[22] Filed: May 30, 1989

Related U.S. Application Data

[63] Continuation-in-part of Ser. No. 138,854, Dec. 29, 1987, Pat. No. 4,861,965.

[51] Int. Cl.$^5$ ................................................ B23K 9/09
[52] U.S. Cl. .......................... 219/130.51; 219/137 PS
[58] Field of Search ................... 219/130.51, 137 PS, 219/130.5

[56] References Cited

U.S. PATENT DOCUMENTS

| | | | |
|---|---|---|---|
| 3,382,345 | 5/1968 | Normando | 219/137 PS |
| 3,728,515 | 4/1973 | Gedgaudas | 219/131 R |
| 4,742,208 | 5/1988 | Overman | 219/137 PS |

FOREIGN PATENT DOCUMENTS 0012576  6/1980  European Pat. Off. .
2529031  12/1983  France .

Primary Examiner—Clifford C. Shaw
Attorney, Agent, or Firm—Body, Vickers & Daniels

[57] ABSTRACT

A method and apparatus for TIG welding by passing an alternating current between a non-consumable electrode and a workpiece to form an arc, which apparatus comprises a single reactor with first and second coil portions and a common core, passing a direct current from a direct current power supply through the first coil portion of the reactor and in a negative direction from the workpiece to the electrode for creating a heating cycle, switchably disconnecting the direct current power supply from the circuit and immediately connecting the second coil portion of the reactor in a positive direction across the electrode and workpiece for creating a short cleaning cycle for cleaning the workpiece preparatory to the next heating cycle. These heating and cleaning cycles are continued to create a TIG welding process. During the negative current flow, energy and/or current to the arc is controlled by pulsing a FET switch with a pulse width modulated device adjusted by an error signal created by comparing the sensed arc current and a reference signal or set point.

33 Claims, 4 Drawing Sheets

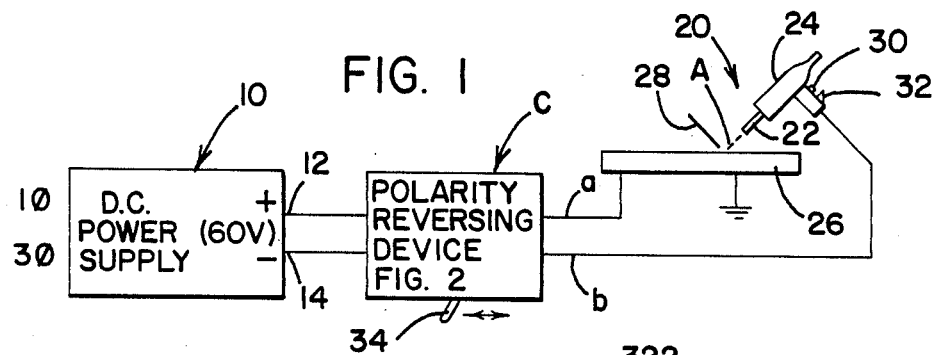
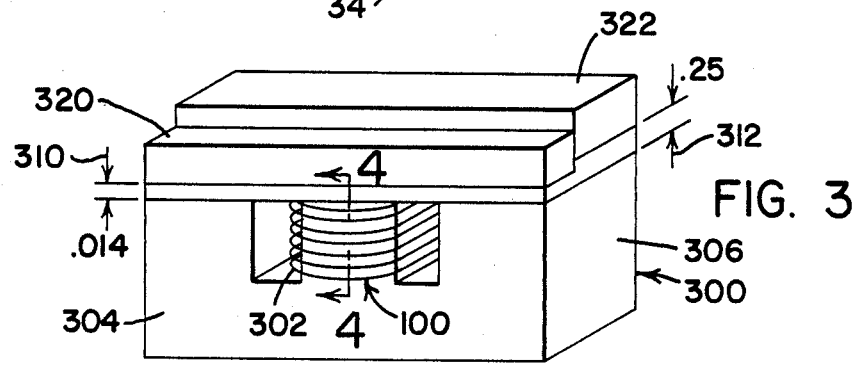
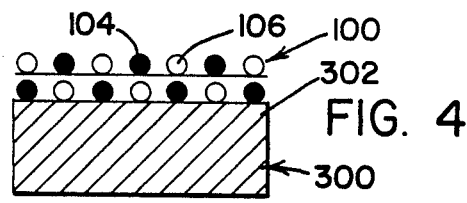
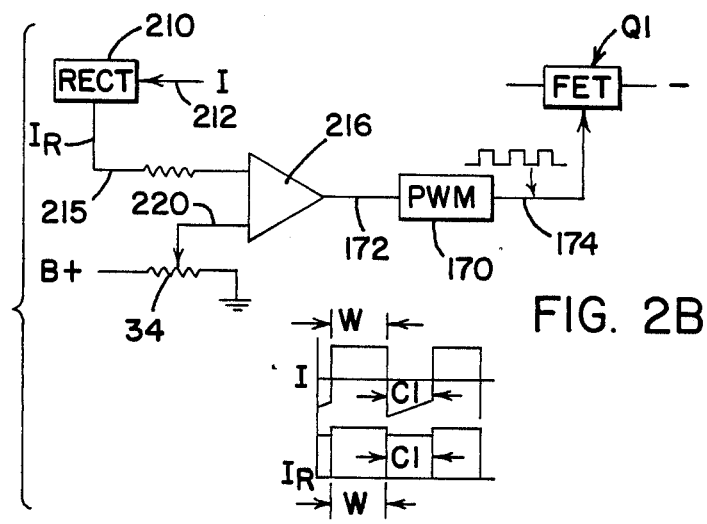

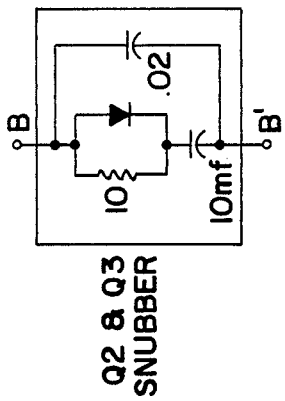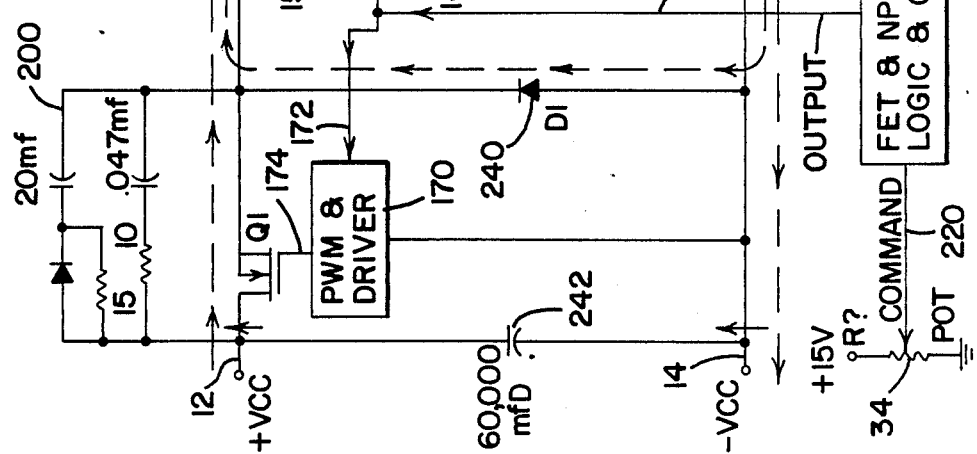

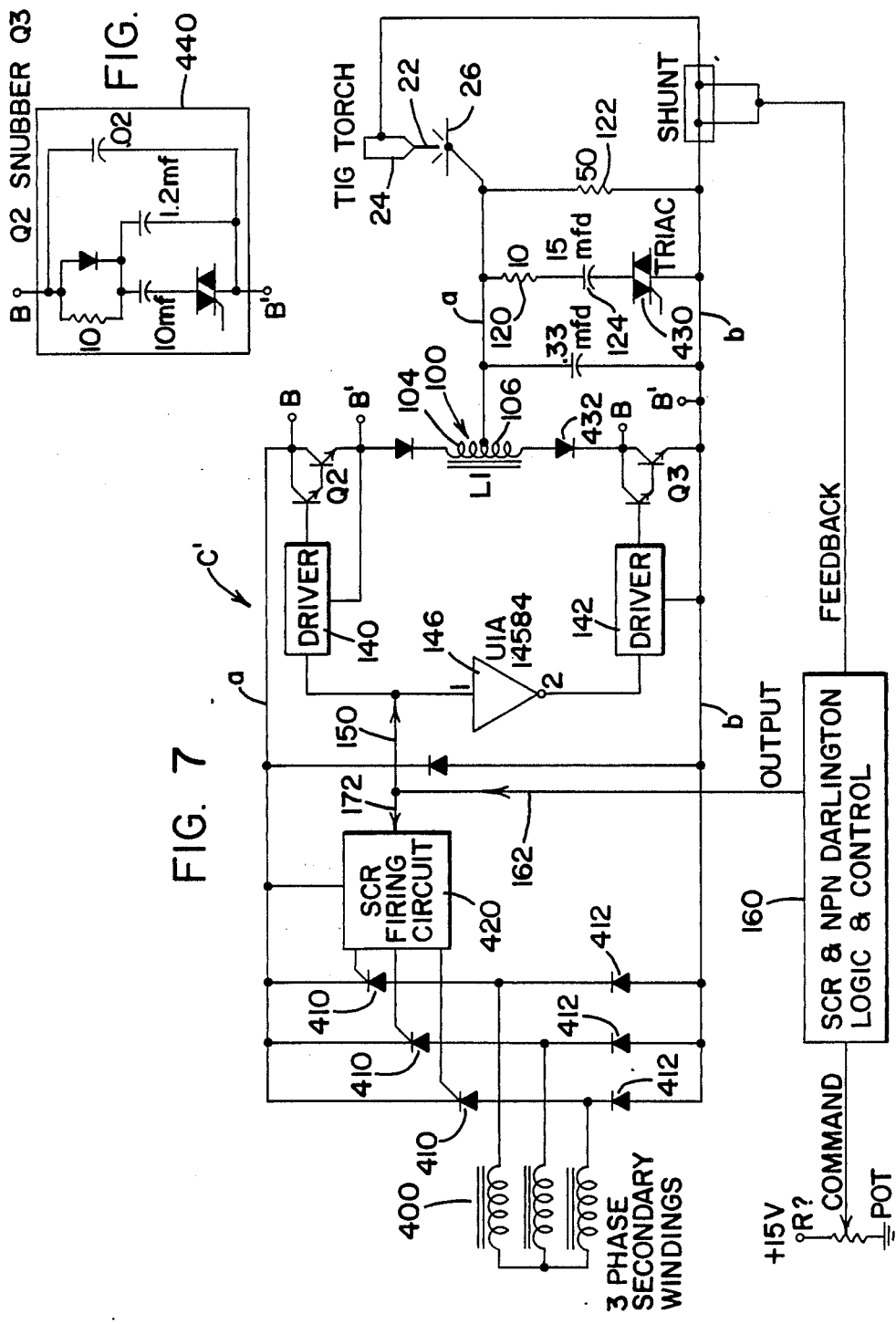

METHOD AND APPARATUS FOR TIG WELDING

This invention is a continuation-in-part of prior application Ser. No. 138,854, filed Dec. 29, 1987 now U.S. Pat. No. 4,861,965.

INCORPORATION BY REFERENCE

Application Ser. No. 138,854 filed Dec. 29, 1989, is incorporated by reference herein as background information.

The present invention relates to the art of arc welding and more particularly to a method and apparatus for TIG welding of metals, and especially adapted for TIG welding aluminum.

The invention is particularly applicable to the art of TIG welding aluminum and it will be described with particular reference thereto; however, it is appreciated that the invention has much broader applications and may be used in various arc welding processes employing both a consumable or non-consumable electrode, wherein it is desirable to periodically reverse the polarity of the current flow in the arc between the electrode and the workpiece with a direct current power supply.

In welding aluminum, and similar metals, it has become somewhat common practice to use TIG welding wherein a non-consumable electrode, such as a tungsten electrode, is spaced from the workpiece a distance sufficient to establish an arc when current flow is created by a voltage across the spacing. Since aluminum oxidizes quite easily, it is necessary to remove aluminum oxide from the welding surface as filler wire is melted by the heat of the arc and deposited onto the aluminum workpiece. It has become somewhat common practice to clean the metal by using an alternating current power supply for directing an alternating current through the gap or spacing between the electrode and workpiece. In accordance with this practice, during the positive cycle, the electrode is positive with respect to the workpiece; therefore, electrons are emitted from the workpiece. This process disintegrates and removes aluminum oxide from the surface preparatory to the immediately following negative cycle wherein the tungsten or other non-consumable electrode is negative with respect to the workpiece. Electrons are emitted from the tungsten electrode in the direction of the workpiece for the purpose of relatively efficient heating in the arc area. By employing alternating current through the arc, alternate primarily cleaning cycles and heating cycles are created to provide a fairly efficient TIG welding procedure for aluminum. Even though this welding process is successful and widely used, substantial practical and procedural disadvantages have been experienced. For instance, it is not an optimally efficient procedure to employ positive cleaning cycles having durations substantially the same as the duration of the negative polarity heating cycles. The difference in emissivity of the electrode and the workpiece distorts the alternating current cycle, thus, producing a relatively small positive cycle between successive, negative polarity, heating half cycles. This unbalanced output current is typical for saturable reactor type AC power sources which are being used for alternating current TIG welding of aluminum. In addition to the above disadvantages, TIG welding of aluminum is not easily performed with existing equipment used for manual, self-shielded flux cored and gas metal arc welding. Most industrial arc welding power supplies in the field are direct current. Converting these welders to alternating current so that TIG welding can be performed is a costly and impractical procedure for most owners of direct current power supplies.

When direct current power supplies are used for TIG welding, the operator must select the polarity to be used. If mild steel or stainless steel is to be welded, it need not be cleaned therefore, direct current electrode negative TIG welding can be used. This polarity provides no arc cleaning action to remove oxide film; therefore, if used for welding aluminum, preweld cleaning and oxide removal of the welding surface must be accomplished before welding. This is practical only when heavy aluminum plate is TIG welded and the additional precleaning requirement is outweighed by the increased welding speed using electrode negative polarity. In view of this, the operator often selects direct current, electrode positive, TIG welding wherein the current flows from the electrode to the workpiece. This causes a cleaning action in combination with the arc welding procedure, however, it also results in a very slow rate of welding. Even though this concept is technically acceptable, the tungsten electrode becomes extremely hot unless its dimension is drastically increased and water cooling is used. For that reason, using direct current electrode positive to produce a cleaning effect also demands the implementation of a special TIG welding torch. This is expensive, more difficult to control and is generally not acceptable in the field.

In summary, when TIG welding, especially TIG welding of aluminum, a special alternating current power supply must be provided or an operator must employ direct current power supplies with a selected polarity which is not economical, convenient nor the optimum operating procedure.

These and other disadvantages of the present technology involving TIG welding, have been overcome by the present invention which allows use of a direct current power supply to produce the advantage of an alternating current welder.

THE INVENTION

The present invention relates to a device, or a circuit, which can be connected onto a standard direct current power supply for providing a TIG welder having the advantages of alternating current TIG welders.

In accordance with the present invention, there is provided an improvement in a method and apparatus for TIG welding using a direct current power supply, which method and apparatus employ a reactor, or choke, having first and second portions. The direct current power supply is connected across the electrode and workpiece and through the first portion of the reactor. This produces a negative polarity direction for current flow, to produce a preselected heating cycle, during which energy is stored in the reactor. The second portion of the reactor is then placed across the electrode and workpiece in the positive direction for a preselected cleaning cycle. The reversal of polarity of the current is repeated to produce a welding current alternating between a positive polarity cleaning cycle and negative polarity heating cycle. This alternation of the polarity of the current is accomplished by two high speed power switches, with one switch being conductive when another switch is non-conductive, and vice versa. By such a switching scheme, the direct current power supply is connected across the electrode and workpiece in the negative polarity direction for efficient heating. The stored energy is then switched across the workpiece and the electrode in the opposite polarity direction to produce the aforementioned cleaning cycle or procedure. By merely changing the duration when one switch is on and the other switch is off, and vice versa, the duration of the heating cycle can be varied with respect to the duration of the cleaning cycle to adjust the amount of cleaning. Consequently, only the cleaning needed to produce a quality weld is employed. In the past, alternating current TIG welders often had a less accurate arrangement for controlling the energy employed for cleaning. The two alternating cycles are accomplished in an efficient manner, without requiring substantial equipment, technology or modification of an existing direct current power supply available to many low volume welders.

By using the relatively inexpensive circuit, or device of the present invention any normal direct current welder can be converted to a TIG welder having sufficient capabilities to weld aluminum effectively. This relatively simple accessory for converting a direct current power supply to an alternating current TIG welder at a low cost overcomes the disadvantages associated with alternating current welders, wave shaping converters, and use of direct current for TIG welding. Also, the invention can be used for producing a TIG welding power supply by using a rectified input stage.

In accordance with the present invention the system includes a power control switch, such as a high frequency FET switching system (D.C. chopper) for controlling the input energy from the D.C. power supply to the first portion of the inductive reactance or choke during the welding cycle when the arc current has a negative polarity. The energy is controlled by sensing the arc current, rectifying the sensed current, comparing the rectified signal to a reference signal to create an error signal and, then, adjusting operation of the FET switching system, either by pulse width modulation or frequency changing of the FET switching system.

The primary object of the present invention is the provision of a device which can be adapted to a direct current power supply or input stage for converting that power supply or stage into an alternating current TIG welder in the field.

A further object of the present invention is the provision of a device, as defined above, which device overcomes certain disadvantages associated with standard alternating current TIG welders of the type now commonly used for welding aluminum.

Another object of the present invention is the provision of a device, as defined above, which device can weld metal with different cleaning requirements by merely adjusting the duty cycle to provide the proper cleaning energy during cleaning cycles between negative polarity heating cycles.

Yet another object of the present invention is the provision of a device, as defined above, which device converts the direct current output of a standard power supply into an alternating current TIG welder having the capabilities to adjust the duty cycle between cleaning and heating polarities by merely modifying the duty cycle of a standard oscillator.

Another object of the present invention is the provision of a method of operating the device, as defined above, which method employs the concept of a reactance reactor or choke with first and second portions, connecting the first portion of the reactor across the power supply in a negative polarity direction forming a heating cycle and then reversing the procedure by applying the second portion of the reactor across the workpiece in the opposite direction for the purposes of creating an intermediate cleaning cycle similar to the cleaning procedure obtained by standard alternating current TIG welding and, further employing, for energy control, a pulse width modulated FET control switch system, a frequency modulated FET control switch system or an SCR phase controlled rectifier.

The prior application Ser. No. 138,854, filed Dec. 29, 1987, which is incorporated by reference, is directed to the concept of TIG welding and to the concept of converting a somewhat standard, easily obtainable direct current power supply, or welder, to an alternating current type TIG welder. This same concept may be applicable to consumable electrode welding where a consumable electrode is melted and deposited upon a workpiece by globular transfer, short circuiting transfer, pulse current transfer, etc. In any of these systems of metal transfer, it may be advantageous to shift from a positive current to a negative current for purposes of increasing the electrode meltoff rate or for other reasons. The prior invention as well as the present improvement to the prior invention can be employed for providing a momentary current polarity reversal for use in welding, as well as for TIG welding; however, TIG welding is the basic aspect of the prior invention and the present improvement thereto.

During operation of the invention, the energy stored in the reactor or choke of a circuit constructed in accordance with the present invention, is dissipated in the arc when the switching devices of the circuit are in the cleaning cycle or mode. The flux in the reactor is always attempting to flow in the same direction to provide the available current for the rapid, short cleaning pulses inbetween the sustained heating pulses of current. The reactance of the reactor, or choke, has a value which is sized to obtain the results set forth in this application. The rate of current change through the arc is quite rapid at polarity reversals in view of the high reactance of the choke and the immediate change in polarity. This produces a spike at the zero crossing point to sustain the arc when there is a reversal of polarity, which occurs during each switching operation between cycles.

The invention has all the advantages of a normal alternating current, TIG welder with the additional capacity to adjust the relative amount of heating and cleaning of the workpiece for a given period P. This invention causes the electrode polarity of a direct current power source to alternate, which is a concept not heretofore used in TIG welding.

In accordance with the preferred embodiment, a first power switch is conductive for most of the period P. The remaining portion of the current flow, across the arc occurs during the second condition wherein a second power switch is conducting and the first power switch is non-conductive. During this cleaning cycle, arc energy is provided from the stored energy in the reactor. In this manner, high voltage spikes occur across the arc during the zero crossing between polarity reversals to maintain or establish the arc. A duty cycle oscillator controls the ratio of positive to negative polarity to control the extent of the cleaning action created during the positive current flow. The input power supply delivers energy in accordance with manipulation of the control switch system operative during only the weld cycle to provide accurate current control during the weld cycle. Control of the energy transfer and/or current flow during the cleaning cycle is not employed, except to limit the maximum current during a short circuit across the arc gap.

Another application of a current reversal circuit in accordance with the invention would be in the reduction of arc blow. This distortion of the arc, which is caused by magnetic field interaction with the arc plasma, is normally associated with welding consumable electrodes at high DC current levels. This invention will reduce the effects of arc blow by reversing the arc current rapidly.

In accordance with the present invention there is provided a TIG power source designed to utilize a center tapped choke, with switching transistors to generate AC output power from a DC power bus or power supply. The DC bus voltage can be relatively low compared to the open circuit voltage of other DC welding power supplies, since the current reversal employed in the invention is relatively rapid and does not require reignition of the arc across the gap. The DC power supply can be provided from either a single phase or three phase input source. This source is rectified when the invention employs a FET type DC chopper to control the energy directed to the arc. When the invention is practiced by using an SCR phase-back input stage, the input stage or source is rectified during energy control function. In either embodiment, the arc current is varied instantaneously by controlling the FET DC chopper or the SCR phase-back circuit. In accordance with an aspect of the invention, current is sensed at the arc, rectified and compared to a reference signal. This arrangement creates an error signal, which error signal is employed for the purpose of adjusting the current from the DC input stage of the present invention. This feedback control can be accomplished only during the weld cycle of the alternating current operation. During this cycle, current is flowing through one half of the choke. This current flow stores energy in the common core of the choke in an amount determined by the inductance of the choke. When the output polarity of the circuit is reversed, by reversing the power control switches, current flow through the choke is maintained in the same direction. This free flow of current is in a loop, or series circuit, from the center tap of the choke through the second power switch, across the arc and back to the center tap of the choke. Such circuit includes the second half of the choke. In this fashion, current is controlled during one polarity and current freewheels during the other polarity. During the current reversal portion of the cycle, the arc current is derived from the energy stored in the choke and is employed for cleaning of the metal in accordance with standard TIG technology.

The frequency and duty cycle of switching the two power switches between the controlled, driven cycle and the freewheeling cycle is independent of line frequency. In accordance with the invention, the switches are not employed at the same time. The first switch produces the welding cycle and the second switch produces the clean cycle. The energy used during the clean cycle must be replenished during the weld cycle.

The choke, or inductive reactance, of the present invention is designed to dissipate only about 10% of the total energy stored in the choke or reactance during the subsequent clean cycle. When the clean cycle is at its maximum, this duration should not exceed about 40% of the total period, including both clean and weld cycles. Consequently, in accordance with the invention, the duration of the clean cycle is between 10% and 40% of the total period. The stored energy is a function of arc current in only those instances where the core of the choke is not saturated. Consequently, in accordance with an aspect of the invention, the choke is designed with enough inductive reactance to store at least ten times the required energy at high current levels, such as in excess of 200 amperes. At such maximum output currents, the core of the choke or reactor is not operated near the saturation level; therefore, the available energy stored in the choke is not decreased. At minimum output currents, such as in the range of 15–50 amperes, the instantaneous stored energy is reduced to a value of about twice that required by the arc. Thus, in accordance with a limited aspect of the present invention, the core of the choke or inductive reactance is constructed for operation over a wide output current range and includes two separate air gaps to provide dual control. At the lower output currents, a lesser amount of energy is stored in the core. At the higher current levels, higher energy is stored in the core. Arc rectification is virtually eliminated by this aspect of the invention. Welding can be accomplished to a lower level approaching 10 amperes without an imposed radio frequency voltage across the arc for the purposes of maintaining the arc or stabilizing the arc.

The control logic for the system can be used to shift the present invention between an AC operation and a negative DC operation. This shift is accomplished by a single switch having two positions, one of which causes the two power switches to alternate for AC operation and the other of which fixes the two switches so that the negative polarity switch is conducting while the freewheeling switch is non-conducting. In this fashion, a single, two position switch on the torch handle is employed for the purpose of shifting between AC operation and negative DC operation. The operator can shift between negative DC operation and AC operation at the electrode holder or gun, without requiring manipulation at the machine itself. In accordance with another aspect of the invention, the duty cycle between operation of the two power switches can be adjusted by an appropriate device, such as a rheostat on the handle of the welding gun. Consequently, easy manual manipulation at the handle can be accomplished while using the present invention. To reverse the polarity of a DC welding system, the electrode cables can be reversed in accordance with standard practice. This will provide a positive DC welding mode.

In accordance with another aspect of the present invention, a specific modification is made to the choke or inductive reactance which can be used with the present invention. Of course, the present invention can be successfully operated without such modifications in the choke itself. The invention itself relates to the concept of a center tapped choke for AC welding operation employing a duty cycle for alternating two power switches with an input circuit for controlling the current during the weld portion of the cycle in accordance with a feedback signal determined by the instantaneous sensed current. A person skilled in the art would be aware of various choke designs that can be used to accomplish this operation; however, a particular choke design is believed to have merit in application of this concept. This choke design includes two identical windings on a common core employing two different air gaps. The core has a standard width such as approximately 4.0 inches. The first section of the core is a 4.0 inch stack with a small air gap, such as 0.014 inches. The second portion of the core has a longer stack such as approximately 6.0 inches with a greater air gap, such as 0.25 inches. When employing these general parameters, the choke has fifty turns and is center tapped. The 4.0 inch stack saturates at a flux density greater than 100,000 lines/in$^2$ at an operating current of 17.5 amperes. At a lower current, such as 10 amperes, the saturation of this smaller stack is approximately 50,000 lines/in$^2$. The inductance prior to saturation for these lower current values is 0.022514 H. For the higher stack, saturation occurs in excess of 100,000 lines/in$^2$ at approximately 313 amperes. However, the output of the present invention does not operate at saturation level for this high current; therefore, the flux density is maintained less than about 75,000 lines/in$^2$. The inductance for this second core portion is 0.001891 H. Since stored energy is reduced as the core is driven into saturation, such saturation is avoided at low current levels and high current levels; however, by this dual choke construction, these current levels can be drastically different. By using this construction of the core, the two coil portions forming the center tapped choke can operate at low current levels and high current levels. At the higher current level, one section of the choke saturates while the second section does not. In accordance with another aspect of the invention, the second choke section has a conductor size that is approximately 50% of the size of the conductor for the first section. The first section must be rated for maximum DC output whereas the second section only carries the "cleaning" current which is less under normal circumstances.

In accordance with another aspect of the invention, a FET, DC down chopper circuit is used as the series current regulator for a circuit constructed in accordance with the invention. This DC chopper circuit is controlled by a pulse width modulator operated at 20 KHz. The arc current is sensed in the electrode lead and applied to an absolute value circuit, i.e. full wave rectifier, for comparison with an output control potentiometer which establishes the desired output current. An error amplifier produces an error signal controlled by comparison of the instantaneous output current and the potentiometer created set point signal to drive the pulse width modulator integrated circuit. The buffer output of this circuit drives the FET down chopper in accordance with standard practice. The feedback comparator need only employ a minor amount of filtering, since the output choke provides for circuit integration. However, even when control is during the total period, instantaneous regulation of the output current occurs only during the negative or heating cycle. Thus, only electrode negative current is regulated. When using the present invention for TIG welding, heating of the workpiece and arc penetration is a function of only the current flowing during electrode negative polarity. During positive polarity, the cleaning cycle occurs. This cleaning cycle is an application of stored energy from the choke to the arc. During this transfer of stored energy, there is a normal droop associated with the current wave form; therefore, the RMS current value will vary accordingly. If filtering were added to the comparator amplifier, regulation would be instituted to increase the negative current for compensation of the resulting droop. This can not be done since regulation does not occur during this second cycle of the total period. However, since the objective is to maintain constant heating, RMS regulation is not employed. Thus, heating itself is to be regulated as opposed to total current flow. All of these concepts are employed in accordance with the preferred embodiment of the present invention which will be apparent from reviewing the diagrams and drawings used in disclosing the present invention.

BRIEF DESCRIPTION OF DRAWINGS

FIG. 1 is a schematic block diagram illustrating the environment of the present invention;

FIG. 2 is a detailed wiring diagram of a first embodiment of the present invention;

FIG. 2A is a wiring diagram for the snubber used in the two power switches of the embodiment of the invention shown in FIG. 2;

FIG. 2B is a combined wiring diagram and wave shape graph for an aspect of the present invention employed in both illustrated embodiments of the present invention;

FIG. 3 is a schematic diagram illustrating, in a general fashion, an anticipated modification of the core structure used with the preferred embodiments of the present invention;

FIG. 4 is a schematic, cross-sectional view taken generally along line 4—4 of FIG. 3 and illustrating the type of choke winding employed in the preferred embodiments of the present invention;

PREFERRED EMBODIMENTS

Figure 5:
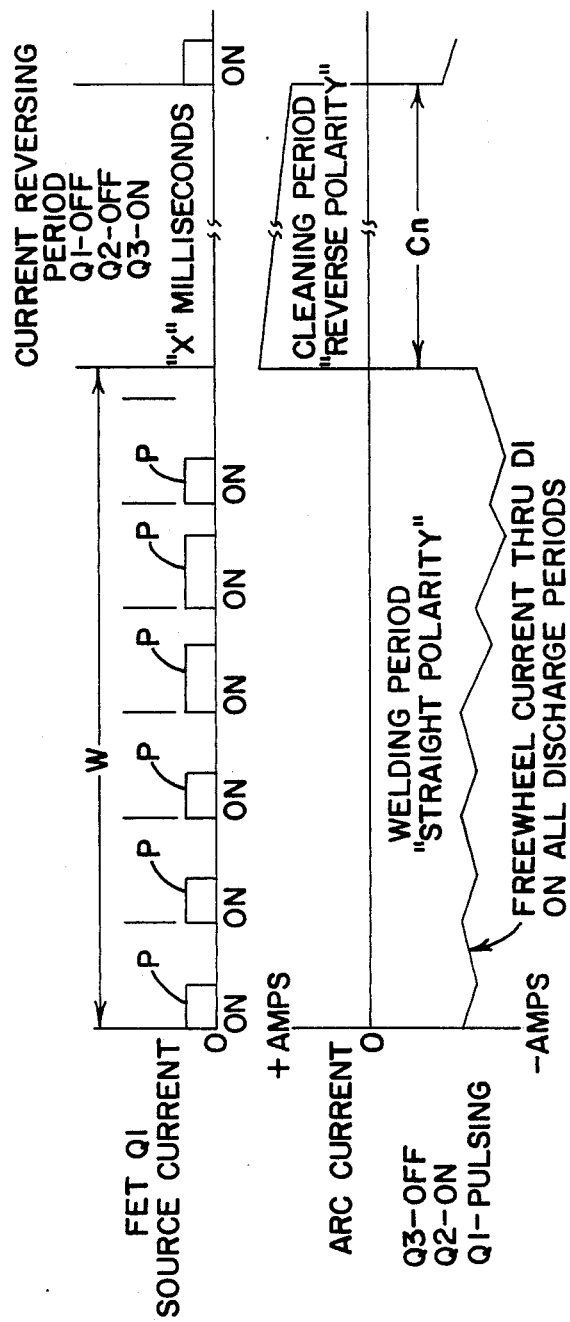
FIG. 5 is a graph illustrating the output current obtained in accordance with the present invention together with switching current pulses for use in accomplishing such output current.

Referring now to the drawings wherein the showings are for the purpose of illustrating a preferred embodiment of the invention only and not for the purpose of limiting same, FIG. 1 shows a DC power supply or stage 10 having output terminals 12, 14 which power supply is driven by either a single phase or three phase input line current to create approximately 60 volts DC open circuit across terminals 12, 14. TIG welder 20 includes a tungsten electrode 22 supported in holder or gun 24 adapted to be held with respect to workpiece 26 so that filler metal 28 can be melted and deposited onto workpiece 26 with heat energy created by current flow in arc A. The present invention relates to a polarity reversing device C, illustrated in the form of a first embodiment shown in FIG. 2 and a second embodiment shown in FIG. 7. This device or circuit C is adapted to convert the direct current from power supply 10 into an AC output current across leads a, b and, thus, across arc A. By using circuit C, the polarity across arc A changes from negative polarity to positive polarity, in sequence, to create both a welding or heat cycle and a clean cycle. In the present invention, a switch 30 mounted on holder 24 shifts the mode of operation of device, or circuit, C between a standard AC TIG welding mode to a negative DC mode with a constant DC voltage being applied across the arc. This mode shift is done by merely manipulating toggle switch 30 on gun or holder 24. In a like manner, a rheostat 32 on the gun or handle can be employed for adjusting the duty cycle between the ratio of the clean cycle duration and the weld cycle duration. Thus, by manual manipulation on the gun or holder, the AC TIG welder can be changed to vary the amount of cleaning accomplished by circuit C. In accordance with another feature of the present invention, a second rheostat 34 is mounted at circuit C for adjusting the control level for output current used during the welding cycle of the TIG welder. If the constant negative DC mode of operation for circuit C is desired, rheostat 34 can be used to adjust the set point for the arc current. This second rheostat is the set point rheostat for an error amplifier in a feedback control to vary the input stage of the present invention to control the arc current during the weld cycle.

Referring now more particularly to the wiring diagram shown in FIG. 2, together with the snubber circuit shown in FIG. 2A and the control circuit of FIG. 2B, polarity reversing circuit C includes an inductive reactance, coil or choke 100 in the form of a center tapped choke 102 having coil portions 104, 106 of equal numbers of turns. The direction of current flow through the choke is limited by diodes 110, 112. Center tap 102 divides choke 100 into equal coil portions which may have different conductor sizes, as previously explained. Circuit C directs current flow through leads a, b, and across arc A in accordance with the conductive condition of a first power switch Q2 and a second power switch Q3. Both of these switches are Darlington connected power transistors and each includes an appropriate snubber circuit shown in FIG. 2A. Drivers 140, 142 operate power switches Q2, Q3 in sequence. When one switch is conducting the other switch is not conducting. To assure this operation, drivers 140, 142 have opposite output logic applied to the input sides of the drivers. Inverter 146 between the two inputs of drivers 140 and 142 maintains the reverse input logic. A positive pulse in input line 150 causes conduction of switch Q2. This same pulse inhibits switch Q3. When the pulse terminates, switches Q2, Q3 toggle. In accordance with the illustrated embodiment, the pulse train on input line 150 is the output pulse train of pulses from a voltage controlled oscillator operating at a preselected frequency. This frequency provides a period determined by the desired relationship between the weld portion of the period and the cleaning portion of the period. Thus, the drivers are shifted between modes in accordance with somewhat standard TIG technology. The ratio or relationship of the duration of the weld cycle to the duration of the clean cycle is controlled by duty cycle control of the pulse train from the voltage controlled oscillator. Control logic circuit 160 contains the voltage controlled oscillator. The duty cycle of this oscillator is adjustable to give the desired heating and cleaning. Line 162 is schematically illustrated as the output of logic circuit 160 and it includes the pulse train in line 150. DC voltage is maintained across terminals 12, 14; therefore, when switch Q2 is ON and switch Q3 is OFF, current flows from terminal 12 through terminal 14 through portion 104 of choke 100. This current flow stores energy in the core of the choke while constituting the welding or heating current flow across arc A. Thereafter, switch Q3 is rendered conductive and switch Q2 is rendered non-conductive. Current stored in the core of choke 100 then flows through lower or second portion 106 of choke 100 from center tap 102, through diode 112 and in the path illustrated by the dashed arrows C1.

This current flow C1 is not governed by input stage 10 and constitutes the clean cycle of the TIG welding operation. Thus, current flow across arc A is in the negative direction during the weld cycle and in the positive direction during the clean cycle. This reverse current flow through the arc gap is standard practice in TIG welding. By storing energy in choke 100 during the weld cycle, the clean cycle is accomplished by releasing the stored energy through diode 112. This concept is novel and is explained in the introductory portion of this disclosure. It is also explained in prior application Ser. No. 138,854 filed Dec. 29, 1987. A filter circuit includes resistors 120, 122 as well as capacitor 124 to provide a filter network across output leads a, b.

In accordance with the present invention, there is provided an input DC chopper comprising a power FET Q1 connected to terminal 12 of power supply or input stage 10. This DC chopper, in accordance with standard practice, is controlled by a pulse width modulator 170 having a fixed frequency and output pulses with widths that are varied in accordance with the voltage in control line 172. Line 172 is a part of the feedback system and is illustrated as an output of the control logic 160. As in the case with pulses in line 150, the voltage on line 172 is an element of the schematically illustrated output 162. Certain details of the preferred arrangement in control logic circuit 160 for developing the control voltage level on line 172 is illustrated in FIG. 2B. Voltage on line 172 is controlled by the output of full wave rectifier 210 driven by the sensed arc current in the form of a signal in line 212. Current is sensed at shunt 214, shown in FIG. 2. This current signal is alternating and forms the input to full wave rectifier 210. The rectified signal $I_R$ in line 215 is directed to a standard error amplifier 216 for producing an error signal as a voltage in line 172. The error signal has a magnitude determined by a set point voltage signal in line 220 from rheostat 34, previously described. Thus, the output arc current is controlled by adjusting the voltage in line 172. This adjustment is made by comparing the sensed current $I_R$ in line 215 at the welding station to a set point current adjusted by rheostat 34. The lower portion of FIG. 2B, is a current graph showing the sensed current I. As can be seen, during the welding cycle W, current I flows through portion 104 of choke 100. As soon as switch Q2 is rendered non-conductive by changing the logic on driver 140, switch Q3 is rendered conductive. This causes an immediate current reversal across arc A. Then the cleaning current C1 flows in an opposite direction across arc A. Current C1 has a magnitude determined by circuit parameters and energy stored during the weld cycle. This current can not be controlled by switch Q1 but freewheels through diode 112. By changing the current level by switch 01 the energy stored in choke 100 can be changed as well as the magnitude of the cleaning current. There is a slight droop to this reverse, clean current C1, as shown in the lower portion of FIG. 2B. The output $I_R$ signal on line 215 at the output of rectifier 210 is shown in the lower portion of the current graph in FIG. 2B. As can be seen, during the weld or heat cycle W, the current has a preselected fixed level. The current then dissipates slightly during the clean cycle. Since rectifier 210 is a full wave rectifier, the output in line 215 is an average of the arc current I during both the weld and clean cycles. This average current is employed for adjusting the voltage level in line 172 to control current flowing through switch Q1. The arc current can be controlled by switch Q1 only during the weld cycle W. Thus, the voltage in line 172 attempts to maintain a fixed current during the weld time W. By providing a full wave rectifier, the input voltage on line 172 is maintained substantially constant and does not oscillate to cause variations should only the instantaneous current during the weld cycle W be monitored in the feedback system.

By providing the current feedback as shown in FIG. 2B to control the voltage in line 172, the AC TIG welding can be controlled during the weld cycle in accordance with the graph shown in FIG. 5. The straight polarity or weld cycle W, which is negative current flow, is shown at the left hand side of FIG. 5. During weld cycle W, switch Q3 is non-conductive. Switch Q2 is conductive. Thus, switch Q1 pulses in accordance with the output of pulse width modulator or driver 170. This driver pulses switch Q1 to create current pulses through the top coil portion 104 of center tapped choke 100 in accordance with pulses P at the base of the FET forming switch Q1. As switch Q1 is rendered conductive by a pulse P, current flows in accordance with the pulses shown in the upper portion of FIG. 5. Pulse width modulator 170 operates at a frequency of 20 KHz. Thus, a pulse P occurs 20,000 times/second. Each pulse P has a width which is adjusted by the voltage on line 172. Corresponding current pulses are caused through switch Q1. In this manner, instantaneous control is exerted over the arc current I during the weld cycle W. If more arc current is required, a longer pulse P is created at the base of switch Q1. It is possible to control switch Q1 by varying the frequency of pulses P, when the pulses have a fixed width. Controlling frequency to control arc current is another mode of operation which could be employed when using the invention; however, the pulse width modulating concept for operating a DC chopper is preferred. At the end of the welding cycle W, switch Q2 is rendered non-conductive and switch Q3 is rendered conductive. This is the clean cycle Cn. At this time, switch Q1 can not control current flow across arc A. Thus, switch Q1 is indicated to be OFF during the clean cycle. Even if switch Q1 were ON during the clean cycle, no current would flow through the switch Q1 because switch Q2 is non-conductive. FIG. 5 illustrates weld or heat cycle W which is followed by the clean cycle Cn. By adjusting the duty cycle of drivers 140, 142 the relationship between the weld cycle W and the clean cycle Cn can be changed.

Figure 6:
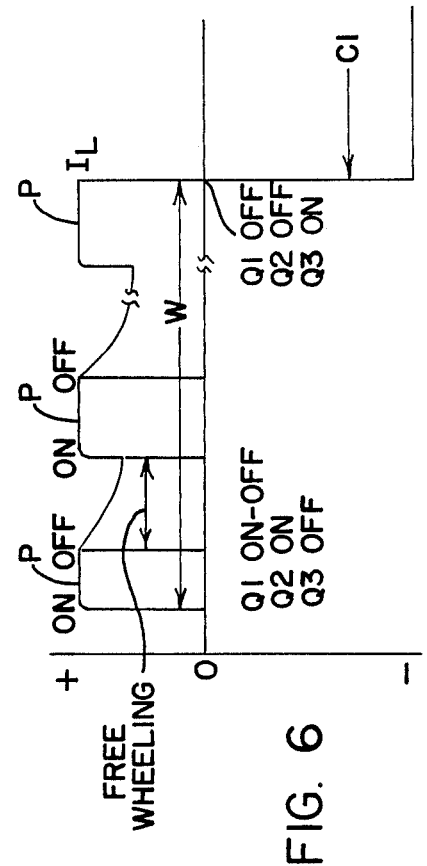
FIG. 6 is a graph showing arc current flow during the negative polarity welding cycle as the input power is modulated by either the FET DC chopper circuit, or an SCR phase-back circuit; and, FIGS. 7 and 7A are wiring diagrams of the second embodiment of the present invention showing the use of an SCR phase-back input in the present invention.

This invention uses the unique concept of a single, center tapped choke having two equal coil portions, one of which carries current during the weld cycle W and the other of which causes current flow by the stored energy of the common core of the choke during the clean cycle Cn. Since switch Q1 is pulsed at a high frequency (i.e. 20 KHz) during each weld cycle W, accurate control is maintained over the instantaneous arc current I during the weld cycle. As shown in FIG. 5, during each pulse P there is current. After pulse P there is a freewheeling current flow through diode 240. This concept is shown as the saw tooth curve for arc current I of FIG. 5 and in more detail in FIG. 6, wherein the current pulses are maintained between the time that Q1 is ON for a time corresponding to a pulse P. Thereafter, there is freewheeling current through switch Q2 when switch Q1 is turned OFF. By reducing the free-wheeling portion, arc current is increased.

Referring now to FIGS. 3 and 4, a concept which can be used in the manufacture of choke 100 is schematically illustrated. In accordance with this concept, core 300 is provided with a central core piece 302 onto which coil portions 104, 106 are wound as schematically illustrated in FIG. 4. Current flow during weld cycle W through portion 104 causes flux to flow through core 302 by way of spaced legs 304, 306. A small air gap 310 is provided in leg 304 and a larger air gap 312 is provided in leg 306. The magnetic circuit is completed through core pieces 320, 322 which are schematically illustrated as being spaced from legs 304, 306 by layers of insulating material forming air gaps 310, 312. At low current, the inductance of coil or choke 100 is determined by a combination of air gaps 310, 312. Thus, during low arc current operation, a first preselected inductance of choke is provided. Neither gaps 310, 312 are saturated and the core does not saturate. Thus a change in arc current I during the weld cycle causes a corresponding change in the clean current C1. When the current increases to a given level, air gap 310 is saturated, then the inductance of the choke changes and the current storage is controlled by only the air gap 312. In this fashion, current of a certain level saturates air gap 310 and changes the inductive reactance of choke 100. By using this concept, it is possible to operate circuit C at low current levels approaching 10 amperes and at high current levels exceeding 300 amperes. During high arc current operation gap 312 does not saturate; thus, there is always maintained a relationship between the heating or weld arc current and the clean current. Since higher arc currents through switch Q2 must be carried by the conductor forming coil portion 104, the conductor of this coil portion has a larger diameter than the conductor of coil portion 106. The number of turns of the coil portions are equal. The parameters of this preferred choke construction have been previously described.

Referring now to FIGS. 7 and 7A, a modification of the preferred embodiment is illustrated. Circuit C1 operates in accordance with the previous discussion wherein weld cycle W involves current flow through coil portion 104 of choke 100 when switch Q2 is conductive and switch Q3 is non-conductive. Thereafter, drivers 140, 142 reverse the conductivity of power switches Q2, Q3. This allows arc current flow by energy stored in choke 100. The wiring diagram of FIG. 7 is solely for the purpose of illustrating an alternating concept for the input stage of circuit C'. In accordance with this alternative, a somewhat standard phase-back SCR rectifier is employed. A three phase transformer 300 provides sinusoidal varying voltages to a series of SCRs 410, each paired with a diode 412. An appropriate SCR firing circuit or trigger circuit 420 is controlled by voltage on line 172 which is included in the control line or harness 162 shown in FIG. 2. As in FIG. 2, logic control circuit 160 controls both the switch drivers 140, 142 and the phase-back trigger circuit 420. To distinguish the two output signals from control logic circuit 160, lines 150, 172 are shown as different lines from a harness 162. Line 172 includes a voltage level. Line 150 includes a pulse train with an adjustable duty cycle. Thus line 162 is a schematic illustration of a harness having at least the two control lines 150, 172. The voltage on line 172 controls the amount of phase-back for SCRs 410 to control the amount of current flowing through switch Q2 during the weld cycle. This operation has been described in detail with respect to FIG. 2 and FIGS. 5 and 6. Since the SCR phase-back input for circuit C' produces a certain amount of ripple, a triac 430 is employed across lines a, b. In addition, a filter circuit somewhat similar to that illustrated in FIG. 2 is employed across these output lines. A further capacitor 432 increases the amount of filtering. Snubber circuit 440 shown in FIG. 7A is connected across terminals B, B1 of the Darlington connected transistors making up switches Q2, Q3. These snubbers provide two levels of control as current flows through switches Q2, Q3 as these switches are conductive.

I claim:

1. In a device, driven by a direct current power supply having a positive output and negative output, for causing an alternating current to flow between the workpiece member and electrode member in an arc welding system, said device comprising: an inductive reactor having a tap, first and second opposite ends and a common core, means for connecting said tap to one of said members, means for connecting the said tap to one of said members, means for connecting the other of said members to one of said power supply outputs, a first power switch, means for connecting said first power switch between the first end of said reactor and one of said power supply outputs having a first polarity, a second power switch, means for connecting said second power switch between the second end of said reactor and the one of said power supply outputs having a second polarity, said switches each having a conductive state allowing flow of current through said reactor in a like direction from said positive output to said negative output, and a control means for said first and second switches, said control means including signal means for shifting between a first condition providing energy from said power supply to said reactor with said first switch in its conductive state and said second switch in its non-conductive state to pass current through said reactor between said first end and said tap to magnetize said core and a second condition supplying energy by said reactor with said second switch in its conductive state and said first switch in its non-conductive state to cause current flow through said reactor between said tap and said second end of said reactor as said common core is demagnetized, the improvement comprising: a power control switch means for controlling the input energy from said direct current power supply to said inductive reactance and between said workpiece member and said electrode member during said first condition, means for sensing an arc parameter during said first condition, means for comparing said sensed parameter to a reference signal to provide an error signal and means for adjusting said power control switch means in accordance with said error signal.

2. The improvement as defined in claim 1 wherein said power control switch is a D.C. chopper driven by high frequency of repetitive pulses for rendering said chopper conductive during each of said pulses and nonconductive between said pulses and including means for modulating said pulses by said error signal.

3. The improvement as defined in claim 2 wherein modulating means includes means for changing the width of said pulses in response to said error signal.

4. The improvement as defined in claim 3 wherein said frequency exceeds about 15 KHz.

5. The improvement as defined in claim 3 wherein said power control switch is an SCR driven phase shift rectifier with a controlled phase-back and including means for changing said phase-back of said rectifier by said error signal.

6. The improvement as defined in claim 2 wherein said frequency exceeds about 15 KHz.

7. The improvement as defined in claim 6 wherein said power control switch is an SCR driven phase shift rectifier with a controlled phase-back and including means for changing said phase-back of said rectifier by said error signal.

8. The improvement as defined in claim 2 wherein said power control switch is an SCR driven phase shift rectifier with a controlled phase-back and including means for changing said phase-back of said rectifier by said error signal.

9. The improvement as defined in claim 1 wheren said sensed parameter is the rectified total arc current.

10. The improvement as defined in claim 1 wherein said power control switch is an SCR driven phase shift rectifier with a controlled phase-back and including means for changing said phase-back of said rectifier by said error signal.

11. The improvement as defined in claim 10 wherein said first condition has a first duration and said second condition has a second duration and said signal means includes timing means for changing at least one of said first and second durations.

12. The improvement as defined in claim 11 including a manual holder for said electrode member and a manually manipulated element on said holder for operating said timing means.

13. The improvement as defined in claim 14 wherein said power control switch is an SCR driven phase shift rectifier with a controlled phase-back and including means for changing said phase-back of said rectifier by said error signal.

14. A device as defined in claim 11 wherein said timing means includes means for maintaining the sum of said first and second durations generally equal.

15. A device as defined in claim 14 wherein said first polarity is positive.

16. A device as defined in claim 14 wherein said timing means is a duty cycle oscillator.

17. A device as defined in claim 16 wherein said device is adapted for use in a TIG welding system where said electrode member is a non-consumable electrode, said timing means includes means for selecting said first duration to be substantially greater than said second duration.

18. A device as defined in claim 14 wherein said device is adapted for use in a TIG welding system where said electrode member is a non-consumable electrode, said timing means includes means for selecting said first duration to be substantially greater than said second duration.

19. A device as defined in claim 11 wherein said first polarity is positive.

20. A device as defined in claim 11 wherein said timing means is a duty cycle oscillator.

21. A device as defined in claim 20 wherein said device is adapted for use in a TIG welding system where said electrode member is a non-consumable electrode, said timing means includes means for selecting said first duration to be substantially greater than said second duration.

22. A device as defined in claim 11 wherein said device is adapted for use in a TIG welding system where said electrode member is a non-consumable electrode, said timing means includes means for selecting said first duration to be substantially greater than said second duration.

23. A device as defined in claim 1 wherein said first polarity is positive.

24. A method of TIG arc welding by passing an alternating current between a non-consumable electrode member, and a workpiece member in the form of an arc, said method comprising the steps of:
(a) during a first condition, connecting a D.C. power supply to cause weld current flow through a first switch and a first coil portion of a reactor having a core and a second coil portion in series with said first coil portion, said weld current flow being across said members with a polarity causing said current flow to be in a given direction in said first coil portion of said reactor and in a negative direction from the workpiece to said electrode while storing energy in a the core of said reactor;
(b) during a second condition, disconnecting said power supply from across said members while immediately connecting said second portion of said reactor in a positive polarity direction across said members for a given duration whereby current flows in a positive direction from said electrode member to said workpiece member during said duration by energy stored in said reactor and flowing in said given direction in said reactor;
(c) repeating steps (a) and (b) in sequence; and,
(d) controlling the input energy while said D.C. power supply is connected to pass current through said first switch means.

25. The method as defined in claim 24 including the further steps of:
(e) sensing the arc current at least during said first condition;
(f) comparing the sensed arc current with a reference sign to obtain an error signal; and,
(g) adjusting the energy during said first condition by said error signal.

26. The method as defined in claim 24 including the step of adjusting the duty cycle between steps (a) and (b).

27. The method as defined in claim 24 including the step of adjusting said given duration.

28. An apparatus for TIG arc welding by passing an alternating current between a non-consumable electrode member and a workpiece member in the form of an arc, said apparatus comprising: first and second switches, a reactor, means for connecting a D.C. power supply through said first switch and a first coil portion of said reactor and across said members with a polarity causing current flow in a negative direction from the workpiece to said electrode while current is flowing in a given direction in said reactor to store energy in said reactor; means for disconnecting said power supply from across said members while immediately connecting a second coil portion of said reactor in a positive polarity direction across said members whereby current flows in a positive direction from said electrode member to said workpiece member and in said given direction through said second portion of said reactor; means for shifting between said negative and positive polarity directions; and, means for adjusting said input energy during said current flow in a negative direction.

29. A method of TIG arc welding with a D.C. power supply, said method comprising the steps of:
(a) providing a high reactance reactor having first and second coil portions and a common core;
(b) during a first condition, connecting said power supply across said electrode and workpiece to cause current flow in a given direction through said first coil portion of said reactor and in a negative polarity direction for a preselected heating cycle;
(c) during a second condition, disconnecting said power supply from across said electrode and workpiece while immediately connecting the second coil portion of said reactor across said electrode and workpiece in a positive direction for a preselected cleaning cycle by stored energy supplied by said second coil portion of said reactor causing current flow in said given direction through said second coil portion of said reactor;
(d) causing alternation between said heating cycle and said cleaning cycle; and,
(e) controlling the current flow in said given direction by a repetitively operated switching means.

30. A control circuit for converting a D.C. power supply having opposite polarity output terminals into an A.C. welding supply for directing welding current alternately between a first and second polarity through an arc gap between an electrode element and workpiece element, said control circuit comprising: a common inductive reactor having a center tap dividing said reactor into first and second coil portions joined at a center tap, first switch means for passing welding current through only said first coil portion of said reactor to said center tap in a given direction to cause current flow in a first polarity through said arc gap, whereby energy is stored in said reactor, second switch means for electrically connecting only said second portion of said reactor across said arc gap to cause current flow in a second polarity through said arc gap and in said given direction through said second portion for said reactor, means for alternately actuating said first and second switch means at a preselected rate whereby current flows through said arc gap with its polarity alternating at said preselected rate, and means for adjusting the current flow through said first switch means to control the power to said arc gap.

31. A device for TIG arc welding with a direct current power supply having a positive output and negative output by causing a controlled duty cycle alternating current to flow between the workpiece and electrode, said device comprising: an inductive reactor having a center tap and first and second opposite ends defining a first coil portion and a second coil portion, means for connecting said center tap to said workpiece, means for connecting said electrode to said negative output of said power supply, a first power switch, means for connecting said first power switch between the first end of said reactor and said positive output, a second power switch, means for connecting said second power switch between the second end of said reactor and negative output, said switches each having a conductive state allowing flow of current through said reactor in a like direction, a control means for said first and second switches, said control means including signal means for shifting between a first condition with said first switch in its conductive state and said second switch in its non-conductive state and a second condition with said second switch in its conductive state and said first switch in its non-conductive state whereby current flows in a first direction from said positive output to said workpiece and from said workpiece to said electrode and to said negative output during said first condition and in a second direction during said second condition from said electrode to said workpiece and from energy stored in said reactor during said first condition and said inductive reactor including a common core, said coil portions being wound onto said core in a like winding direction, said core including a first air gap means constructed to saturate at a first, low flux density and a second air gap means constructed to saturate at a second high flux density level exceeding the maximum current condition of said TIG welding device.

32. A device for TIG arc welding with a direct current power supply having a positive output and negative output by causing a controlled duty cycle alternating current to flow between the workpiece and electrode, said device comprising: an inductive reactor having a center tap and first and second opposite ends defining a first coil portion and a second coil portion, means for connecting said center tap to said workpiece, means for connecting said electrode to said negative output of said power supply, a first power switch, means for connecting said first power switch between the first end of said reactor and said positive output, a second power switch, means for connecting said second power switch between the second end of said reactor and negative output, said switches each having a conductive state allowing flow of current through said reactor in a like direction, a control means for said first and second switches, said control means including signal means for shifting between a first condition with said first switch in its conductive state and said second switch in its non-conductive state and a second condition with said second switch in its conductive state and said first switch in its non-conductive state whereby current flows in a first direction from said positive output to said workpiece and from said workpiece to said electrode and to said negative output during said first condition and in a second direction during said second condition from said electrode to said workpiece and from energy stored in said reactor during said first condition and means for controlling the current to said arc during said first condition, said current control means includes means for sensing the arc current, means for comparing the instantaneous arc current to a reference signal to create an error signal and means for adjusting said current through said first switch means during said first condition in accordance with the magnitude of said error signal.

33. A device for TIG arc welding with a direct current power supply having a positive output and negative output by causing a controlled duty cycle alternating current to flow between the workpiece and electrode, said device comprising: an inductive reactor having a center tap and first and second opposite ends defining a first coil portion and a second coil portion, means for connecting said center tap to said workpiece, means for connecting said electrode to said negative output of said power supply, a first power switch, means for connecting said first power switch between the first end of said reactor and said positive output, a second power switch, means for connecting said second power switch between the second end of said reactor and negative output, said switches each having a conductive state allowing flow of current through said reactor in a like direction, a control means for said first and second switches, said control means including signal means for shifting between a first condition with said first switch in its conductive state and said second switch in its non-conductive state and a second condition with said second switch in its conductive state and said first switch in its non-conductive state whereby current flows in a first direction from said positive output to said workpiece and from said workpiece to said electrode and to said negative output during said first condition and in a second direction during said second condition from said electrode to said workpiece and from energy stored in said reactor during said first condition and a manual holder for said electrode member and a manually manipulated switch means having a first inoperative condition and a second operative condition with said first power switch held conductive and said second power switch means held non-conductive.

* * * * *

UNITED STATES PATENT AND TRADEMARK OFFICE
CERTIFICATE OF CORRECTION

PATENT NO. : 4,947,021

DATED : August 7, 1990

INVENTOR(S) : Elliott K. Stava

It is certified that error appears in the above-identified patent and that said Letters Patent is hereby corrected as shown below:

Column 10, line 55, delete "Ol" and substitute --- Q1 ---. Column 12, line 50, delete "300" and substitute --- 400 ---. Column 13, line 4, "432" should be deleted and substitute therefor --- 124; line 6, delete "Bl" and substitute --- B' ---. Claim 13, line 1, "14" should read -- 11 ---. Claim 24, line 14, delete "a". Claim 30, line 17, delete "for" and substitute --- of ---.

Signed and Sealed this

Seventh Day of April, 1992

Attest:

HARRY F. MANBECK, JR.

*Attesting Officer*      *Commissioner of Patents and Trademarks*